US008185905B2

(12) United States Patent
Cook

(10) Patent No.: US 8,185,905 B2
(45) Date of Patent: May 22, 2012

(54) RESOURCE ALLOCATION IN COMPUTING SYSTEMS ACCORDING TO PERMISSIBLE FLEXIBILITIES IN THE RECOMMENDED RESOURCE REQUIREMENTS

(75) Inventor: Steven Daryl Cook, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 1952 days.

(21) Appl. No.: 11/084,819

(22) Filed: Mar. 18, 2005

(65) Prior Publication Data

US 2006/0212871 A1 Sep. 21, 2006

(51) Int. Cl.
*G06F 9/46* (2006.01)

(52) U.S. Cl. ...................................................... 718/104

(58) Field of Classification Search ........... 718/105–104
See application file for complete search history.

(56) References Cited

U.S. PATENT DOCUMENTS

| | | | |
|---|---|---|---|
| 5,838,968 | A | 11/1998 | Culbert |
| 6,151,684 | A | 11/2000 | Alexander et al. |
| 6,314,526 | B1 | 11/2001 | Arendt et al. |
| 6,453,376 | B1 | 9/2002 | Fairman et al. |
| 7,480,914 | B2 * | 1/2009 | Creamer et al. .............. 718/105 |
| 2002/0161889 | A1 | 10/2002 | Gamache et al. |
| 2002/0178396 | A1 | 11/2002 | Wong et al. |
| 2005/0044205 | A1 | 2/2005 | Sankaranarayan et al. |

FOREIGN PATENT DOCUMENTS

EP 0473444 A3 3/1992

OTHER PUBLICATIONS

R. King et al., "HAV: Providing High Availability for Clustered Systems", Proceedings of the ISCA 10th International Conference, Oct. 1997, pp. 51-58.
L. Huang, et al., "Adaptive Multimedia Services Provisioning in Wireless Communication Networks", Proceedings of SPIE, Multimedia Systems and Applications III, Nov. 2000, pp. 151-162.
R. Anane, et al., "Load Sharing in Cluster Service Provision", Proceedings 14th International Workshop on Database and Expert Systems Applications, Sep. 2003.
Y. Fu, et al., "SHARP: An Architecture for Secure Resource Peering", ACM Digital Library, 2003pp. 133-148.
S. Vranes, "Different Approaches to Real-Time Application Allocation to a Multiprocessor System", Jun. 14, 1989, 6pp.
C. Chen, and V. Cherkassky ,"Task Reallocation for Fault Tolerance in Multiprocessor Systems",[Online]1990, [retrieved on Apr. 20, 2009], retrieved from the internet at,URL: http://www.IEEEXplore.com, 6 pp.
IBM China IP Law, Information Disclosure Statement List of References in related Case, Date of Office Action Feb. 13, 2009, 1pg.
Vranes "Different Approaches to Real-Time Application Allocation to a Multiprocessor System", IEEE, 1989, pp. 18-23.
Chen, et al., "Task Reallocation for Fault Tolerance in Multiprocessor Systems", IEEE, 1990, pp. 495-500.

(Continued)

*Primary Examiner* — Jennifer To
*Assistant Examiner* — Eric C Wai
(74) *Attorney, Agent, or Firm* — Rabindranath Dutta; Konrad Raynes and Victor LLP

(57) ABSTRACT

Provided are a method, system, and article of manufacture, wherein a first indicator that indicates a recommended resource requirement for an application is read. A second indicator that indicates a permissible flexibility in the recommended resource requirement for the application is read. The application is allocated to a processing entity of a plurality of processing entities based the first and the second indicators.

29 Claims, 7 Drawing Sheets

OTHER PUBLICATIONS

Beck et al., "Modeling Multicomputer Task Allocation as a Vector Packing Problem", IEEE, 1996, pp. 115-120.

Urgaonkar et al, "Resource Overbooking and Application Profiling in Shared Hosting Platforms", USENIX Association, 5th Symposium on Operation Systems Design and Implementation, Document XP-002380596, pp. 239-254.

International Search Report and Written Opinion dated Jan 6, 2006 for application No. PCT/EP2006/060798, filed Mar 16, 2006.

* cited by examiner

RESOURCE ALLOCATION IN COMPUTING SYSTEMS ACCORDING TO PERMISSIBLE FLEXIBILITIES IN THE RECOMMENDED RESOURCE REQUIREMENTS

BACKGROUND

1. Field

The disclosure relates to a method, system, and article of manufacture for resource allocation in computing systems.

2. Background

A plurality of applications may execute within a computing environment that includes a plurality of resources, such as, memory, ports, etc. Resource provisioning is the process of providing the plurality of applications with access to the plurality of resources. For example, an exemplary application of the plurality of applications may be granted access to a resource included in the plurality of resources, based on certain criteria that may have been set up by an administrator of the computing environment.

Certain computing environments may support a cluster of computers, in which two or more computers are coupled to execute applications. Each computer that belongs to the cluster may be referred to as a node of the cluster. Certain operating systems may support resource provisioning of memory, processor utilization time, and other system resources for applications that are capable of running on the nodes of a cluster.

If resource provisioning is supported, an administrator may set minimum resource requirements for an application to execute on a node of a cluster. When an administrator sets minimum resource requirements for an application to execute on a node of cluster, these minimum resource requirements may reduce the availability of the application, i.e., the application may execute less frequently on the node in comparison to situations where no minimum resource requirements were set on the application. Such minimum resource requirements may prevent the application from being executed on one or more nodes of the cluster when the minimum resource requirements are not available for the application on the one or more nodes.

For example, a cluster may have a hundred nodes, and a first, a second, and a third exemplary application may each be set to execute with a minimum resource requirement of 51% of the memory of a node and 51% of the processing power of the node. In such a case, no more than one of the first, second, and third exemplary applications may execute in a node at the same time. Even though the exemplary cluster has a hundred nodes, no node of the cluster may execute any two applications of the first, second, and third exemplary applications at the same time, e.g., the first and the third exemplary applications cannot be executed on the same node at the same time. Thus, there is no flexibility allowed in the minimum resource requirements of resource provisioning and the lack of flexibility may result in a reduction in the utilization of the nodes of a cluster.

SUMMARY OF THE DESCRIBED EMBODIMENTS

Provided are a method, system, and article of manufacture, wherein a first indicator that indicates a recommended resource requirement for an application is read. A second indicator that indicates a permissible flexibility in the recommended resource requirement for the application is read. The application is allocated to a processing entity of a plurality of processing entities based on the first and the second indicators.

In certain additional embodiments of the present invention, subsequent to the allocating of the application, a determination is made that the processing entity has failed, resulting in a failure of the application. A reallocation is performed of already allocated applications in functional processing entities of the plurality of processing entities based on recommended resource requirements and permissible flexibilities in the recommended resource requirements of the already allocated applications. The application is allocated to one of the plurality of processing entities that is functional based on the first and the second indicators.

In yet additional embodiments of the present invention, a waiting for resources to be released is performed prior to the allocating of the application, in response to determining that the application cannot be allocated to any processing entity.

In further embodiments of the present invention, the application is allocated to the processing entity prior to the reading of the second indicator, in response to determining that sufficient resources are available in the processing entity to satisfy the recommended resource requirement.

In still further embodiments of the present invention, a reallocation is performed of already allocated applications in the plurality of processing entities based on recommended resource requirements and permissible flexibilities in the recommended resource requirements of the already allocated applications, in response to determining that there are inadequate resources for allocating the application to any of the plurality of processing entities.

In additional embodiments of the present invention, the recommended resource requirement is for resources included in the plurality of processing entities, and wherein the resources include memory.

In yet additional embodiments of the present invention, the reading of the first indicator, the reading of the second indicator, and the allocating are performed by a resource allocation application that executes in a computing device that is different from the plurality of processing entities.

In still further embodiments of the present invention, the plurality of processing entities are computing devices that are nodes of a cluster.

In additional embodiments of the present invention, the processing entity is a virtual machine.

Provided further is a method in which a determination is made of a failure of a processing entity, wherein the failed processing entity is included in a plurality of processing entities that have been allocated a plurality of applications based on recommended resource requirements. An application of the failed processing entity is allocated to another processing entity included in the plurality of processing entities, based on reallocating at least one of the plurality of applications, wherein the reallocating is based on the recommended resource requirements and permissible flexibilities in the recommended resource requirements.

Provided further is a method for deploying computing infrastructure, comprising integrating computer-readable code into a computing system, wherein the code in combination with the computing system is capable of reading a first indicator that indicates a recommended resource requirement for an application. The code is further capable of reading a second indicator that indicates a permissible flexibility in the recommended resource requirement for the application. The code is also capable of allocating the application to a processing entity of a plurality of processing entities based on the first and the second indicators.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments of the present invention may be utilized and structural and operational changes may be made.

Certain embodiments of the present invention allow a flexibility to be associated with the provisioning of resources in a computing system. If the recommended resource requirements for an application are not available, a resource allocation application may determine whether there is any flexibility associated with the provisioning of resources. If so, the resource allocation application may allocate the application to a processing entity, such as, a node of a cluster, based on the flexibility associated with the provisioning of resources.

Figure 1:
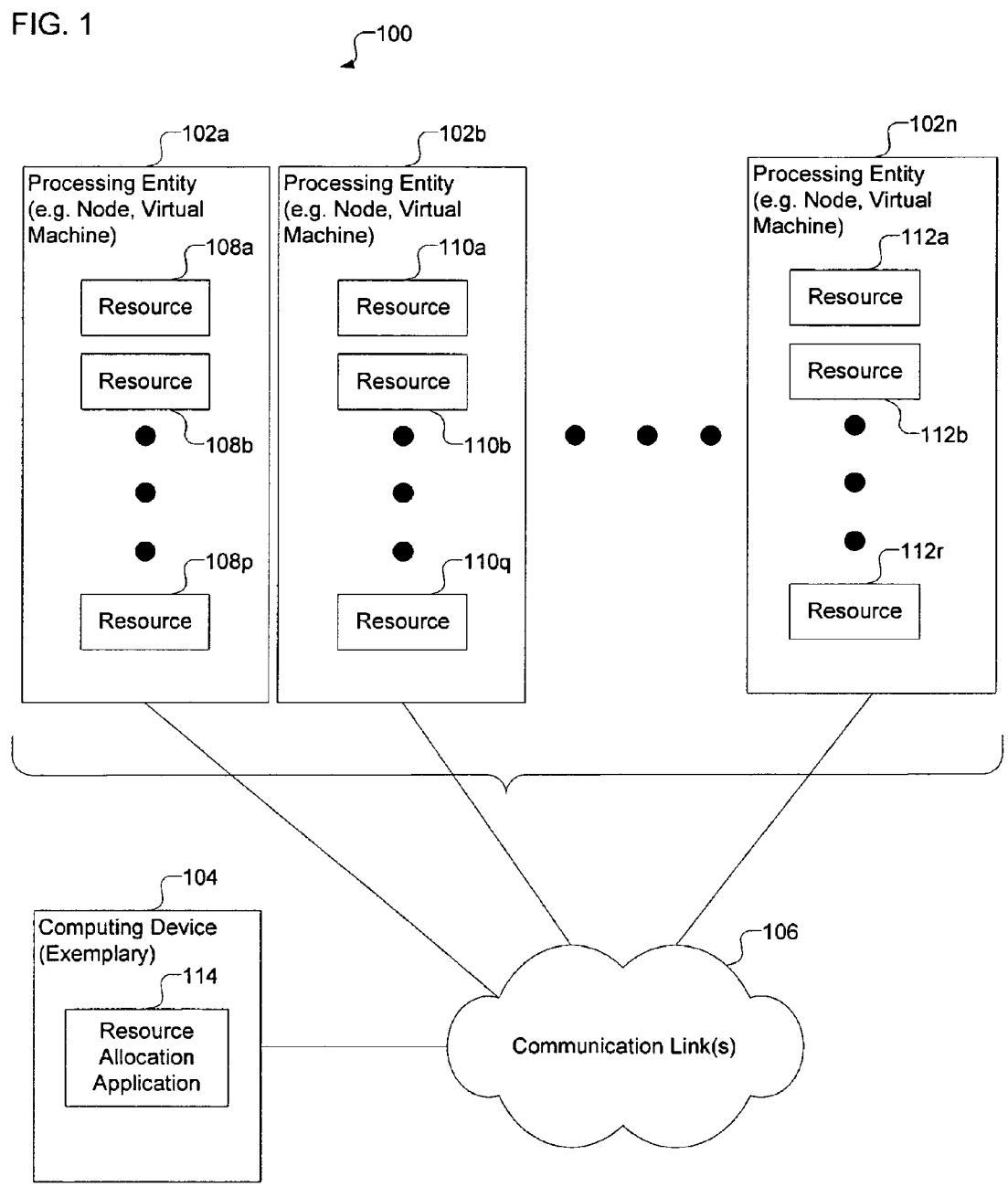
FIG. 1 illustrates a block diagram of a computing environment in accordance with certain embodiments of the present invention.

FIG. 1 illustrates a block diagram of a computing environment 100 in accordance with certain embodiments of the present invention. A plurality of processing entities 102a, 102b, . . . , 102n are coupled to a computing device 104 over one or more communication links 106.

In certain embodiments of the present invention, the processing entities 102a . . . 102n may include nodes of a cluster, where the nodes of the cluster may be any suitable computing device, including those presently known in the art, such as, a client, a storage server, a server, a personal computer, a workstation, a mainframe, a midrange computer, a network appliance, a palm top computer, a telephony device, a blade computer, a hand held computer, etc. In other embodiments of the present invention, the processing entities 102a . . . 102n may include virtual machines that simulate certain operations of a computing device. The processing entities 102a . . . 102n include one or more resources, such as memory, secondary storage, processor, etc. For example, the processing entity 102a may include resources 108a, 108b, . . . , 108p, the processing entity 102b may include resources 110a, 110b, . . . , 110q, and the processing entity 102n may include resources 112a, 112b, . . . , 112r. Applications (not shown) or processes (not shown) that execute on the processing entities 102a . . . 102n may use the resources included in the processing entities 102a . . . 102n.

The computing device 104 may include a resource allocation application 114, where the resource allocation application 114 allocates applications or processes to the processing entities 102a . . . 102n based on the resource requirements of the applications or processes. For example, the resource allocation application 114 may allocate a first and a second application for execution on the processing entity 102a, and allocate a third application for execution on the processing entity 102b. While the resource allocation application 114 has been shown in the computing device 104, in certain alternative embodiments of the present invention the resource allocation application may execute in one or more of the processing entities 102a . . . 102n.

The communication links 106 may include a network, such as, a local area network (LAN), a wide area network (WAN), a storage area network (SAN), an intranet, the Internet. In certain embodiments of the present invention, the communication links 106 may directly couple the processing entities 102a . . . 102n and the computing device 104. In other embodiments of the present invention, the communication links 106 may be implemented in software, such as, via inter-process communication mechanisms. For example, if the processing entities 102a . . . 102n are virtual machines, then the communication links 106 may be implemented in software to allow communication with the virtual machines.

Therefore, FIG. 1 illustrates certain embodiments of the present invention in which a resource allocation application 114 allocates applications or processes to a plurality of processing entities 102a . . . 102n based on the resource requirements of the applications or processes.

Figure 2:
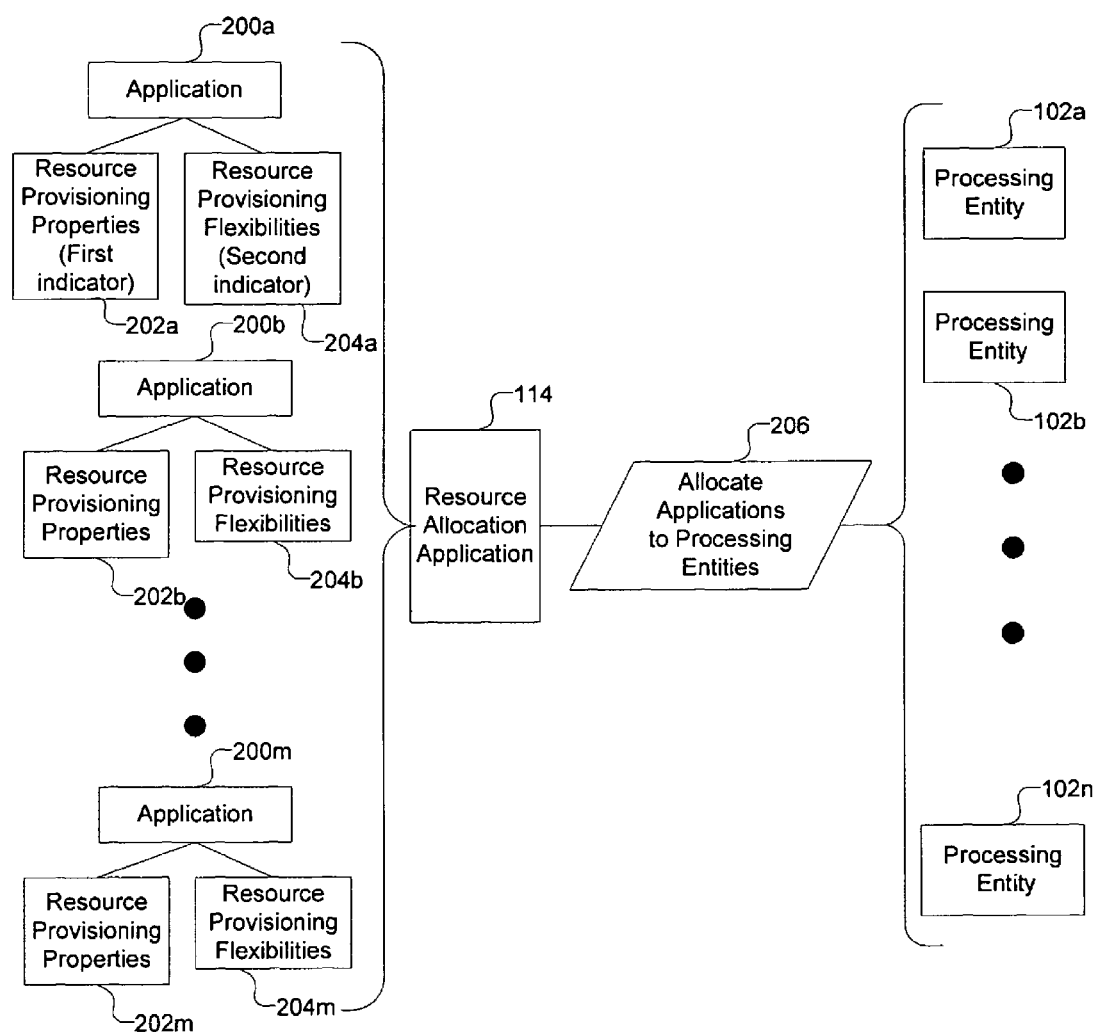
FIG. 2 illustrates a block diagram that shows the allocation of applications to processing entities by a resource allocation application, in accordance with certain embodiments of the present invention.

FIG. 2 illustrates a block diagram that shows the allocation of exemplary applications 200a, 200b, . . . , 200m to the processing entities 102a . . . 102n by the resource allocation application 114, in accordance with certain embodiments of the present invention.

Associated with each of the exemplary applications 200a . . . 200m are one or more resource provisioning properties and one or more resource provisioning flexibilities. For example, resource provisioning properties 202a and resource provisioning flexibilities 204a are associated with the application 200a, resource provisioning properties 202b and resource provisioning flexibilities 204b are associated with the application 200b, and resource provisioning properties 202m and resource provisioning flexibilities 204m are associated with the application 200m.

A resource provisioning property associated with an application indicates the recommended resource requirements for executing an application on a processing entity. For example, resource provisioning properties 202a may include an indication that 256 Mbytes of memory are recommended for the execution of application 200a on a processing entity, such as, any of the processing entities 102a . . . 102n. In such a case, the resource allocation application 114 may initially perform a resource provisioning of 256 Mbytes of memory while attempting to allocate the application 200a to the processing entities 102a . . . 102n.

A resource provisioning flexibility associated with an application indicates the flexibility associated with recommended resource requirements indicated in a resource provisioning property. The flexibility may indicate a permissible reduction in the recommended resource requirements. For example, resource provisioning flexibilities 204a may include an indicator with an indication that application 200a can be executed with a minimum of 50% of the recommended resource requirements indicated in the resource provisioning properties 202a. In such a case, if the resource provisioning properties 202a recommend 256 Mbytes of memory for executing application 200a, then the application 200a may be executed with a minimum of 128 Mbytes of memory which is 50% of the recommended resource requirements.

Therefore, FIG. 2 illustrates certain embodiments of the present invention in which the resource allocation application 114 allocates (at block 206) applications 200a . . . 200m to processing entities 102a . . . 102n based on the resource provisioning properties 202a . . . 202m and the resource provisioning flexibilities 204a . . . 204m.

Figure 3:
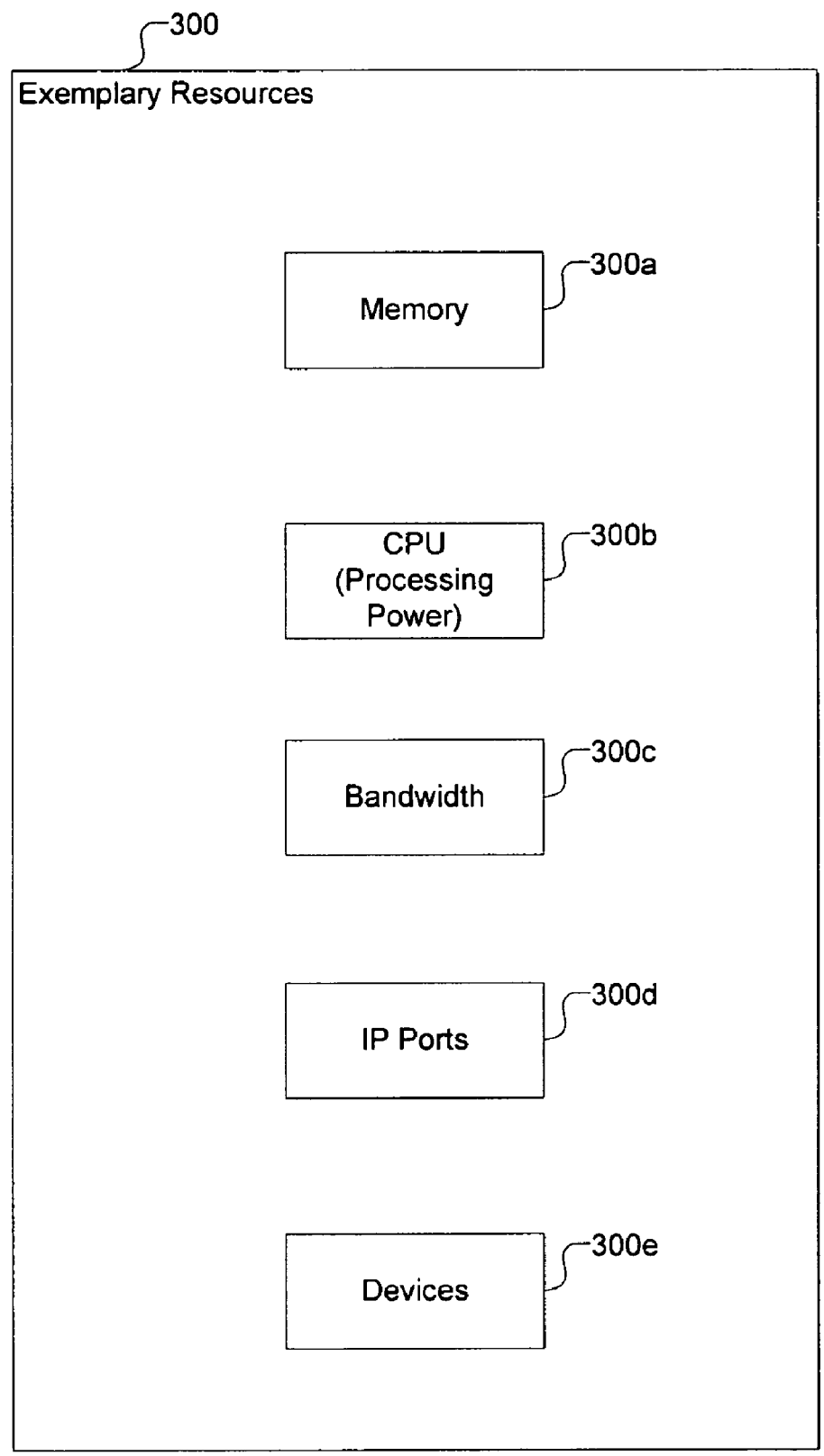
FIG. 3 illustrates a block diagram of exemplary resources, in accordance with certain embodiments of the present invention.

FIG. 3 illustrates a block diagram of exemplary resources 300 included in the processing entities 102a . . . 102n, in accordance with certain embodiments of the present invention. The exemplary resources may include memory 300a, Central Processing Unit (CPU) 300b, bandwidth 300c, Internet Protocol (IP) ports 300d, devices 300e, etc. In certain embodiments of the present invention, other resources may also be included in the processing entities 102a . . . 102n.

In certain embodiments of the present invention, an administrator or an automated process may assign for the applications 200a . . . 200m, the resource provisioning properties 202a . . . 202m and the resource provisioning flexibilities 204a . . . 204m. For example, recommended requirements and flexibilities of the amount of memory 300a, the amount of processing power of the CPU 300b, the amount of bandwidth 300c for communication, the number of IP ports 300d, specific devices 300e, such as, printers, scanners, tape drives, etc., may be indicated in the resource provisioning properties 202a . . . 202m and the resource provisioning flexibilities 204a . . . 204m.

Therefore, FIG. 3 illustrates certain embodiments of the present invention in which recommended requirements and flexibilities for the recommended requirements of exemplary resources 300, included in the processing entities 102a . . . 102n, are indicated in the resource provisioning properties 202a . . . 202m and the resource provisioning flexibilities 204a . . . 204m associated with the applications 200a . . . 200m.

Figure 4:
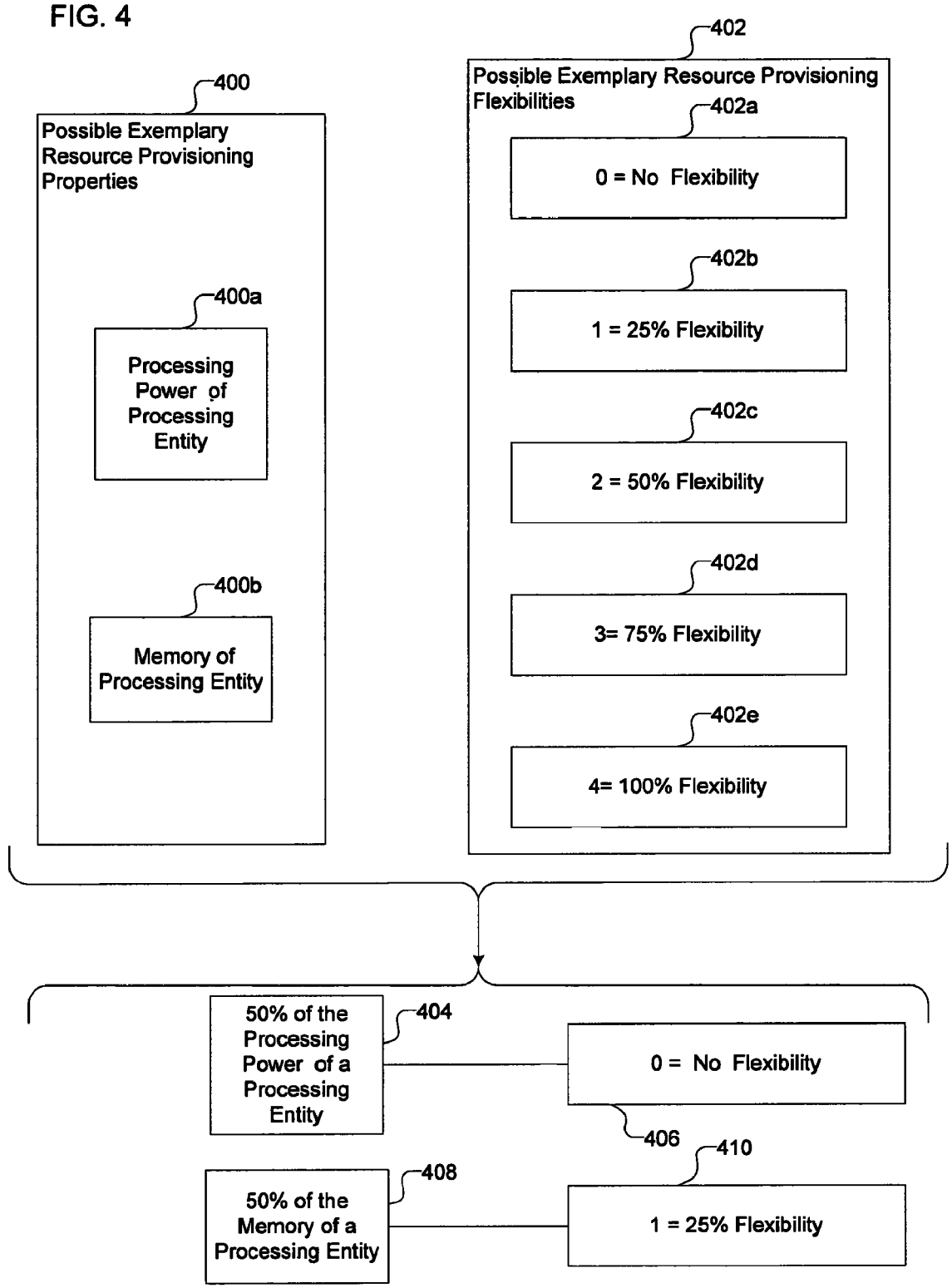
FIG. 4 illustrates a block diagram of resource provisioning properties and corresponding resource provisioning flexibilities, in accordance with certain embodiments of the present invention.

FIG. 4 illustrates a block diagram of possible exemplary resource provisioning properties 400 and corresponding possible exemplary resource provisioning flexibilities 402, in accordance with certain embodiments of the present invention.

Possible exemplary resource provisioning properties 400 may include one indicator 400a that indicates the recommended requirement for processing power of a processing entity and another indicator 400b that indicates the recommended requirement for the memory of a processing entity.

Possible exemplary resource provisioning flexibilities 402 may include indicators 402a, 402b, 402c, 402d, and 402e that, for example, may be 0, 1, 2, 3, 4 and 5 respectively, where an indicator of "0" 402a indicates no flexibility, an indicator of "1" 402b indicates 25% flexibility, an indicator of "2" 402c indicates 50% flexibility, and indicator of "3" 402d indicates 75% flexibility, and an indicator of "4" 402e indicates 100% flexibility. With 0% flexibility an application cannot run without the indicated recommended resource requirement, and with 100% flexibility an application can run even without any amount of the indicated recommended resource requirement.

For example, on the basis of the possible exemplary resource provisioning properties 400 and the possible exemplary resource provisioning flexibilities 402, an application may have associated with the application a recommended resource requirement of 50% of the processing power of a processing entity (block 404) with no flexibility (block 406), and a recommended resource requirement of 50% of the memory of a processing entity (block 408) with 25% flexibility (block 410).

Therefore, FIG. 4 illustrates certain embodiments of the present invention in which an exemplary application has a resource provisioning property 404 with a resource provisioning flexibility 406, and a resource provisioning property 408 with a resource provisioning flexibility 410.

Figure 5:
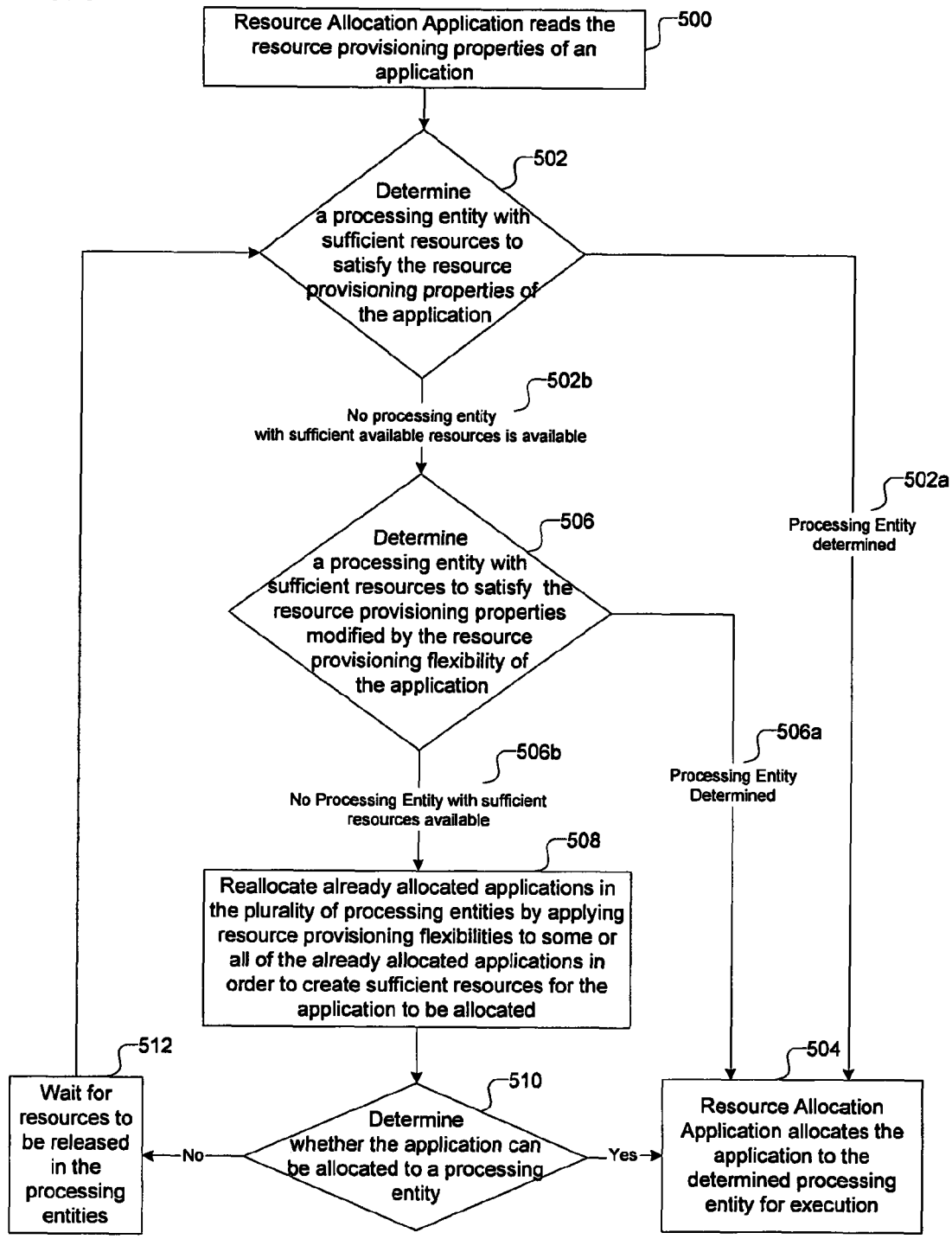
FIG. 5 illustrates operations for allocating an application to a processing entity, in accordance with certain embodiments of the present invention.

FIG. 5 illustrates operations for allocating an application 200a . . . 200m to a processing entity 102a . . . 102n, in accordance with certain embodiments of the present invention. The operations may be implemented in the resource allocation application 114.

Control starts at block 500, where the resource allocation application 114 reads the resource provisioning properties of an application to be allocated to one of the processing entities 102a . . . 102n. For example, the resource allocation application 114 may read the resource provisioning properties 202a of the application 200a.

The resource allocation application 114 determines (at block 502) a processing entity 102a . . . 102n with sufficient resources to satisfy the resource provisioning properties 202a of the application. In response to such a processing entity being determined 502a, the resource allocation application 114 allocates (at block 504) the application to the determined processing entity for execution.

If at block 502, a determination is made that no processing entity with sufficient available resources is available 502b, then the resource allocation application 114 determines (at block 506) a processing entity with sufficient resources to satisfy the resource provisioning properties modified by the resource provisioning flexibilities of the application. For example, the resource allocation application 114 may determine for the application 200a, a processing entity that satisfies the minimum requirements indicated by the resource provisioning properties 202a and the resource provisioning flexibility 204b. In response to such a processing entity being determined 506a the resource allocation application 114 allocates (at block 504) the application to the determined processing entity for execution.

If at block 506, a determination is made that there is no processing entity with sufficient resources available 506b, then the resource allocation application 114 reallocates (at block 508) already allocated applications in the plurality of processing entities 102a . . . 102n by applying resource provisioning flexibilities 204a . . . 204m to some or all of the already allocated applications in order to create sufficient resources for the application to be allocated. As a result, certain of the already allocated application may run with less than the recommended resource requirements but still with at least the minimum resource requirement calculated from the resource provisioning flexibilities.

The resource allocation application 114 then determines (at block 510) whether the application can be allocated to a processing entity. If so, the resource allocation application 114 allocates (at block 504) the application to the processing entity for execution. For example, the resource allocation application 114 may determine that application 200a may be allocated to processing entity 102b for execution.

If at block 510, the resource allocation application 114 determines that the application cannot be allocated to a processing entity, then the resource allocation application 114 waits (at block 512) for resources to be released in the processing entities 102a . . . 102n before transferring control to block 502.

Therefore, FIG. 5 illustrates certain embodiments of the present invention in which the resource allocation application 114 can if necessary allocate an application to one of the processing entities 102a ... 102n based on the resource provisioning properties 202a ... 202m, and the resource provisioning flexibilities 204a ... 204m of the application and other applications executing in the processing entities 102a ... 102n.

Figure 6:
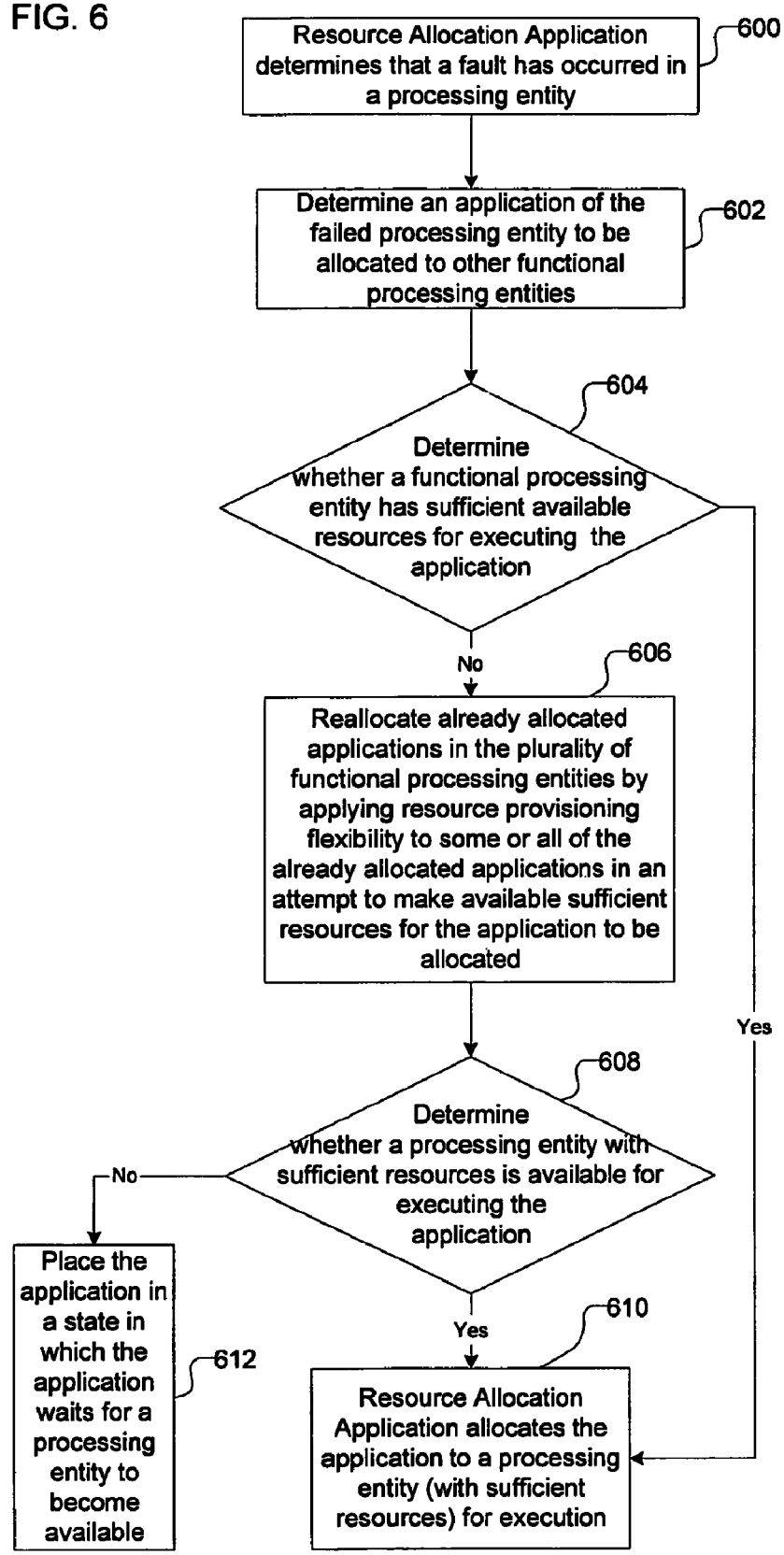
FIG. 6 illustrates operations for reallocating applications in response to a fault in one of a plurality of processing entities, in accordance with certain embodiments of the present invention.

FIG. 6 illustrates operations for reallocating applications in response to a fault in one of a plurality of processing entities 102a ... 102n, in accordance with certain embodiments of the present invention. The operations may be implemented in the resource allocation application 114.

Control starts at block 600, where the resource allocation application 114 determines that a fault has occurred in a processing entity. The fault may prevent the execution of new and existing applications in the processing entity that has failed and generated the fault.

The resource allocation application 114 determines (at block 602) an application of the failed processing entity to be allocated to functional processing entities, i.e., processing entities that have not failed. The application to be allocated is a failed application as the processing unit on which the application was executing has failed. For example, if application 200a was executing on the failed processing entity 102a, then the resource allocation application 114 may determine that the failed application 200a is to be allocated to one of the functional processing entities 102b ... 102n, where the functional processing entities 102b ... 102n have not generated a fault that indicates a processing entity failure.

The resource allocation application 114 determines (at block 604) whether a functional processing entity has sufficient available resources for executing the failed application. If not, the resource allocation application 114 reallocates (at block 606) already allocated applications in the plurality of functional processing entities by applying resource provisioning flexibilities 204a ... 204n to some or all of the already allocated applications in an attempt to make available sufficient resources for the failed application to be allocated. After performing the reallocation of the already allocated applications, the resource allocation application 114, determines (at block 608) whether a processing entity with sufficient resources is available for executing the application. If so, the resource allocation application 114 allocates (at block 610) the failed application to the processing entity that has sufficient resources for executing the application. If not, the resource allocation application 114 may place (at block 612) the application in a state in which the application waits for a processing entity to become available. For example, the resource allocation application 114 may hold the application in a temporarily suspended state. In alternative embodiments of the present invention, the application may be terminated instead of being placed in a state in which the application waits for a processing entity to become available.

If at block 604, the resource allocation application 114 determines that a functional processing entity has sufficient available resources for executing the application then the resource allocation application 114 allocates (at block 610) the failed application to a processing entity that has sufficient resources for executing the failed application.

Therefore, FIG. 6 illustrates certain embodiments of the present invention in which in response to a failure of a processing unit, the applications of the failed processing unit are allocated to one of the functional processing unit. If necessary, applications already allocated to the functional processing units are reallocated on the basis of the resource provisioning properties 202a ... 202m and the resource provisioning flexibilities 204a ... 204m of the already allocated applications.

Certain embodiments of the present invention allow applications 200a ... 200m to be allocated to processing entities 102a ... 102n based on resource provisioning properties 202a ... 202m and resource provisioning flexibilities 204a ... 204m. In case of a failure of one or more of the processing entities 102a ... 102n, already allocated applications in the functional processing entities may be reallocated based on resource provisioning properties 202a ... 202m and resource provisioning flexibilities 204a ... 204m to allow failed applications of the failed processing entities to be allocated to the functional processing entities.

In certain embodiments of the present invention, in which the processing entities 102a ... 102n are nodes of a cluster, a provisioning system implemented in the cluster may execute in association with the clustering system to determine the number of nodes that are active participants in the cluster, and to determine the recommended and minimum resource requirements of application actively running on the nodes, in order to maximize resource availability to the applications and the utilization of resources in the clustered nodes. The cluster administrator may use a default automated provisioning or can adjust the provisioning with a prioritized hierarchy of applications and resources. In the event of failures of nodes of the clustered system, the applications in the cluster are reallocated. As more nodes of the clustered system fail, the more aggressive the resource provisioning per application becomes, because resources allocated to executing applications are reduced to allocate failed applications.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments of the present invention, the code may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments of the present invention, and that the article of manufacture may comprise any information bearing medium known in the art. For example, the article of manufacture comprises a storage medium having stored therein instructions that when executed by a machine results in operations being performed.

Figure 7:
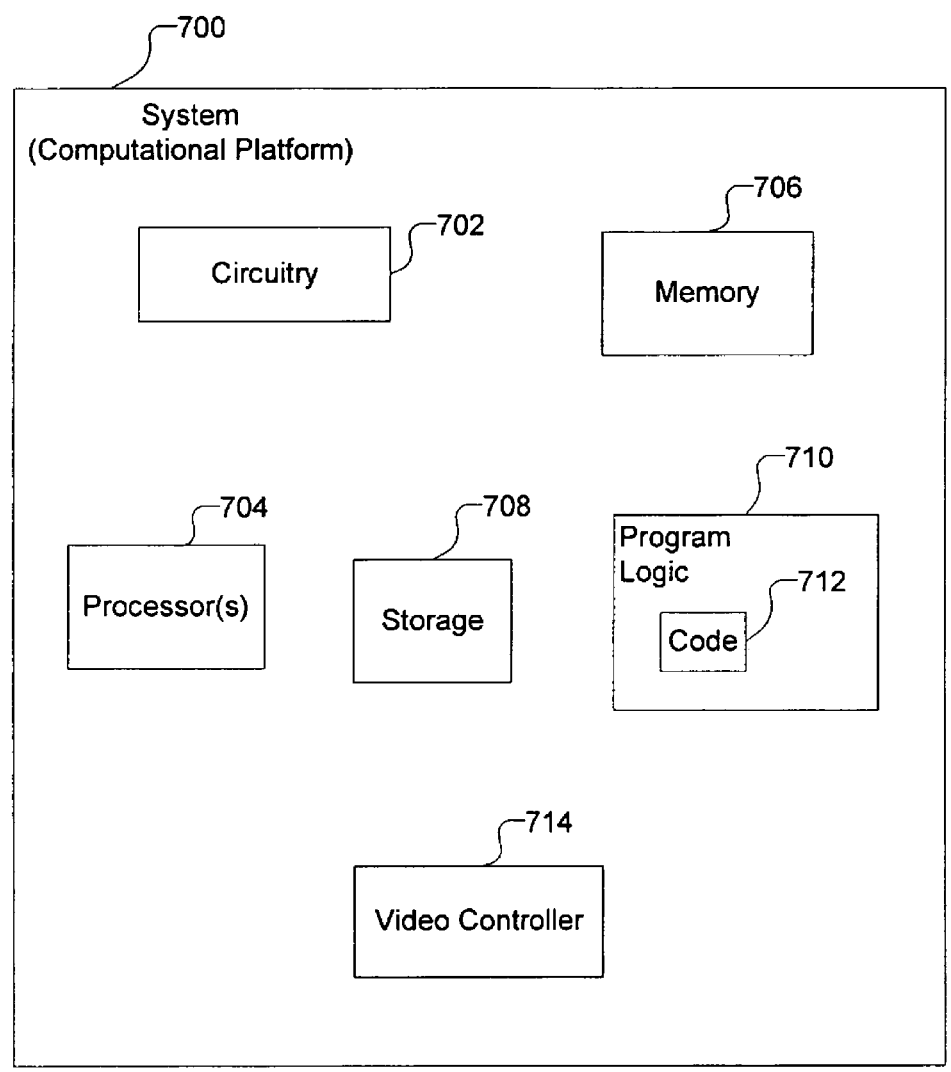
FIG. 7 illustrates a system in which certain embodiments of the present invention are implemented.

FIG. 7 illustrates a block diagram of a system 700 in which certain embodiments of the present invention may be implemented. In certain embodiments of the present invention, the processing entities 102a ... 102n and the computing device 104 may be implemented in accordance with the system 700. The system 700 may include a circuitry 702 that may in certain embodiments of the present invention include a processor 704. The system 700 may also include a memory 706 (e.g., a volatile memory device), and storage 708. Certain elements of the system 700 may or may not be found in some or all of the processing entities 102a ... 102n and computing device 104. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments of the present invention, the program logic 710 including code 712 may be stored in the storage 708. In certain other embodiments of the present invention, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments of the present invention may be directed to a method for deploying computing instruction by a person or automated processing integrating computer-readable code into a computing system, wherein the code in combination with the computing system is enabled to perform the operations of the described embodiments of the present invention.

At least certain of the operations illustrated in FIGS. 5-6 may be performed in parallel as well as sequentially. In alternative embodiments of the present invention, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments of the present invention, the data structures and components may be structured differently and have fewer, more or different fields or different functions than those shown or referred to in the figures.

Therefore, the foregoing description of the embodiments of the present invention has been presented for the purposes of illustration and description. It is not intended to be exhaustive or to limit the embodiments of the present invention to the precise form disclosed. Many modifications and variations are possible in light of the above teaching.

What is claimed is:

1. A method, comprising:
   reading, by a computational device, a first indicator that indicates recommended resource requirements for an application, wherein the recommended resource requirements indicate at least a recommended fraction of a processing power of a processing entity and a recommended fraction of a memory of the processing entity;
   reading, by the computational device, a second indicator that indicates permissible flexibilities in the recommended resource requirements for the application, wherein a permissible flexibility in the recommended fraction of the memory of the processing entity is greater than a permissible flexibility in the recommended fraction of the processing power of the processing entity, wherein the second indicator is selected from a group of indicators and different indicators of the group of indicators are associated with different levels of flexibilities in the recommended resource requirements for the application, and wherein:
   prior to the reading of the first indicator and the second indicator the computational device receives an assignment of values for the first and the second indicators from an administrator; and
   the assignment of the values causes the second indicator to indicate that the application is executable with at least a predetermined fraction of the recommended resource requirement for the application that is indicated by the first indicator; and
   allocating, by the computational device, the application to a processing entity of a plurality of processing entities based on the assignment of the values for the first and the second indicators received from the administrator.

2. The method of claim 1, further comprising:
subsequent to the allocating of the application, determining whether the processing entity has failed, resulting in a failure of the application;
in response to determining that the processing entity has failed resulting in the failure of the application, reallocating already allocated applications in functional processing entities of the plurality of processing entities based on recommended resource requirements and permissible flexibilities in the recommended resource requirements of the already allocated applications; and
allocating the application to one of the plurality of processing entities that is functional, based on the first and the second indicators.

3. The method claim 1, further comprising:
waiting for resources to be released prior to the allocating of the application, in response to determining that the application cannot be allocated to any processing entity.

4. The method of claim 1, further comprising:
allocating the application to the processing entity prior to the reading of the second indicator, in response to determining that sufficient resources are available in the processing entity to satisfy the recommended resource requirement.

5. The method of claim 1, further comprising:
reallocating already allocated applications in the plurality of processing entities based on recommended resource requirements and permissible flexibilities in the recommended resource requirements of the already allocated applications, in response to determining that there are inadequate resources for allocating the application to any of the plurality of processing entities.

6. The method of claim 1, wherein the recommended resource requirement is for resources included in the plurality of processing entities, and wherein the resources include memory.

7. The method of claim 1, wherein the reading of the first indicator, the reading of the second indicator, and the allocating are performed by a resource allocation application that executes in a computing device that is different from the plurality of processing entities.

8. The method of claim 1, wherein the plurality of processing entities are computing devices that are nodes of a cluster.

9. The method of claim 1, wherein the processing entity is a virtual machine.

10. A system in communication with a plurality of processing entities, the system comprising:
   memory;
   processor coupled to the memory, wherein the processor is capable of performing operations, the operations comprising:
   (i) reading a first indicator that indicates recommended resource requirements for an application, wherein the recommended resource requirements indicate at least a recommended fraction of a processing power of a processing entity and a recommended fraction of a memory of the processing entity;
   (ii) reading a second indicator that indicates permissible flexibilities in the recommended resource requirements for the application, wherein a permissible flexibility in the recommended fraction of the memory of the processing entity is greater than a permissible flexibility in the recommended fraction of the processing power of the processing entity, wherein the second indicator is selected from a group of indicators and different indicators of the group of indicators are associated with different levels of flexibilities in the recommended resource requirements for the application, and wherein:
      prior to the reading of the first indicator and the second indicator receiving an assignment of values for the first and the second indicators from an administrator; and
      the assignment of the values causes the second indicator to indicate that the application is executable with at least a predetermined fraction of the recommended resource requirement for the application that is indicated by the first indicator; and
   (iii) allocating the application to a processing entity of a plurality of processing entities based on the assignment of the values for the first and the second indicators received from the administrator.

11. The system of claim 10, the operations further comprising:
   subsequent to the allocating of the application, determining whether the processing entity has failed, resulting in a failure of the application;
   in response to determining that the processing entity has failed resulting in the failure of the application, reallocating already allocated applications in functional processing entities of the plurality of processing entities based on recommended resource requirements and permissible flexibilities in the recommended resource requirements of the already allocated applications; and
   allocating the application to one of the plurality of processing entities that is functional, based on the first and the second indicators.

12. The system claim 10, the operations further comprising:
   waiting for resources to be released prior to the allocating of the application, in response to determining that the application cannot be allocated to any processing entity.

13. The system of claim 10, the operations further comprising:
   allocating the application to the processing entity prior to the reading of the second indicator, in response to determining that sufficient resources are available in the processing entity to satisfy the recommended resource requirement.

14. The system of claim 10, the operations further comprising:
   reallocating already allocated applications in the plurality of processing entities based on recommended resource requirements and permissible flexibilities in the recommended resource requirements of the already allocated applications, in response to determining that there are inadequate resources for allocating the application to any of the plurality of processing entities.

15. The system of claim 10, wherein the recommended resource requirement is for resources included in the plurality of processing entities, and wherein the resources include random access memory.

16. The system of claim 10, wherein the reading of the first indicator, the reading of the second indicator, and the allocating are performed by a resource allocation application that executes in a computing device that is different from the plurality of processing entities.

17. The system of claim 10, wherein the plurality of processing entities are computing devices that are nodes of a cluster.

18. The system of claim 10, wherein the processing entity is a virtual machine.

19. A computer readable storage medium for controlling a plurality of processing entities, wherein code stored in the computer readable storage medium when executed by a processor causes operations, the operations comprising:
   reading a first indicator that indicates recommended resource requirements for an application, wherein the recommended resource requirements indicate at least a recommended fraction of a processing power of a processing entity and a recommended fraction of a memory of the processing entity;
   reading a second indicator that indicates permissible flexibilities in the recommended resource requirements for the application, wherein a permissible flexibility in the recommended fraction of the memory of the processing entity is greater than a permissible flexibility in the recommended fraction of the processing power of the processing entity, wherein the second indicator is selected from a group of indicators and different indicators of the group of indicators are associated with different levels of flexibilities in the recommended resource requirements for the application, and wherein:
      prior to the reading of the first indicator and the second indicator receiving an assignment of values for the first and the second indicators from an administrator; and
      the assignment of the values causes the second indicator to indicate that the application is executable with at least a predetermined fraction of the recommended resource requirement for the application that is indicated by the first indicator; and
   allocating the application to a processing entity of a plurality of processing entities based on the assignment of the values for the first and the second indicators received from the administrator.

20. The computer readable storage medium of claim 19, the operations further comprising:
   subsequent to the allocating of the application, determining that the processing entity has failed, resulting in a failure of the application;
   reallocating already allocated applications in functional processing entities of the plurality of processing entities based on recommended resource requirements and permissible flexibilities in the recommended resource requirements of the already allocated applications; and allocating the application to one of the plurality of processing entities that is functional, based on the first and the second indicators.

21. The computer readable storage medium claim 19, the operations further comprising:
waiting for resources to be released prior to the allocating of the application, in response to determining that the application cannot be allocated to any processing entity.

22. The computer readable storage medium of claim 19, the operations further comprising:
allocating the application to the processing entity prior to the reading of the second indicator, in response to determining that sufficient resources are available in the processing entity to satisfy the recommended resource requirement.

23. The computer readable storage medium of claim 19, the operations further comprising:
reallocating already allocated applications in the plurality of processing entities based on recommended resource requirements and permissible flexibilities in the recommended resource requirements of the already allocated applications, in response to determining that there are inadequate resources for allocating the application to any of the plurality of processing entities.

24. The computer readable storage medium of claim 19, wherein the recommended resource requirement is for resources included in the plurality of processing entities, and wherein the resources include memory.

25. The computer readable storage medium of claim 19, wherein the reading of the first indicator, the reading of the second indicator, and the allocating are performed by a resource allocation application that executes in a computing device that is different from the plurality of processing entities.

26. The computer readable storage medium of claim 19, wherein the plurality of processing entities are computing devices that are nodes of a cluster.

27. The computer readable storage medium of claim 19, wherein the processing entity is a virtual machine.

28. A system, comprising:
a processor;
a memory coupled to the processor;
means for reading a first indicator that indicates recommended resource requirements for an application, wherein the recommended resource requirements indicate at least a recommended fraction of a processing power of a processing entity and a recommended fraction of a memory of the processing entity;
means for reading a second indicator that indicates permissible flexibilities in the recommended resource requirements for the application, wherein a permissible flexibility in the recommended fraction of the memory of the processing entity is greater than a permissible flexibility in the recommended fraction of the processing power of the processing entity, wherein the second indicator is selected from a group of indicators and different indicators of the group of indicators are associated with different levels of flexibilities in the recommended resource requirements for the application, and wherein:
prior to the reading of the first indicator and the second indicator receiving an assignment of values for the first and the second indicators from an administrator; and
the assignment of the values causes the second indicator to indicate that the application is executable with at least a predetermined fraction of the recommended resource requirement for the application that is indicated by the first indicator; and
means for allocating the application to a processing entity of a plurality of processing entities based on the assignment of the values for the first and the second indicators received from the administrator.

29. A method for deploying computing infrastructure, comprising integrating computer-readable code into a computing system, wherein the code in combination with the computing system is capable of performing:
reading, by the computing system, a first indicator that indicates recommended resource requirements for an application, wherein the recommended resource requirements indicate at least a recommended fraction of a processing power of a processing entity and a recommended fraction of a memory of the processing entity;
reading, by the computing system, a second indicator that indicates permissible flexibilities in the recommended resource requirements for the application, wherein a permissible flexibility in the recommended fraction of the memory of the processing entity is greater than a permissible flexibility in the recommended fraction of the processing power of the processing entity, wherein the second indicator is selected from a group of indicators and different indicators of the group of indicators are associated with different levels of flexibilities in the recommended resource requirements for the application, and wherein:
prior to the reading of the first indicator and the second indicator the computing system receives an assignment of values for the first and the second indicators from an administrator; and
the assignment of the values causes the second indicator to indicate that the application is executable with at least a predetermined fraction of the recommended resource requirement for the application that is indicated by the first indicator; and
allocating, by the computing system, the application to a processing entity of a plurality of processing entities based on the assignment of the values for the first and the second indicators received from the administrator.

* * * * *